(12) United States Patent
Kolliopoulos

(10) Patent No.: US 7,025,304 B2
(45) Date of Patent: Apr. 11, 2006

(54) HELICOPTER MESSENGER CABLE ILLUMINATION

(75) Inventor: Daniel Kolliopoulos, Great Mills, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 389 days.

(21) Appl. No.: 10/834,154

(22) Filed: Apr. 23, 2004

(65) Prior Publication Data

US 2005/0236516 A1 Oct. 27, 2005

(51) Int. Cl.
B64F 1/12 (2006.01)

(52) U.S. Cl. .................... 244/115; 244/114 R
(58) Field of Classification Search ............ 244/114 R, 244/115, 116, 110 C, 110 E, 110 F
See application file for complete search history.

(56) References Cited

U.S. PATENT DOCUMENTS

| | | | | |
|---|---|---|---|---|
| 3,552,688 A | * | 1/1971 | Baekken | 244/115 |
| 3,552,689 A | * | 1/1971 | Baekken | 244/115 |
| 4,174,081 A | * | 11/1979 | Sardanowsky | 244/17.17 |
| 4,319,722 A | * | 3/1982 | Pesando | 244/116 |
| 4,786,014 A | * | 11/1988 | Pesando et al. | 244/115 |
| 4,842,219 A | * | 6/1989 | Jakubowski et al. | 244/31 |
| 4,890,802 A | * | 1/1990 | Burgess et al. | 244/115 |
| 4,896,620 A | * | 1/1990 | Jones | 114/253 |
| 4,999,640 A | * | 3/1991 | Wheeler | 343/706 |
| 5,039,034 A | * | 8/1991 | Burgess et al. | 244/110 F |
| 5,092,540 A | * | 3/1992 | Burgess et al. | 244/110 F |
| 5,123,615 A | * | 6/1992 | Wagner et al. | 244/116 |
| 5,687,930 A | * | 11/1997 | Wagner et al. | 244/116 |
| 6,527,226 B1 | * | 3/2003 | Clifford et al. | 244/115 |

OTHER PUBLICATIONS

"Shipboard Helicopter handling—for when it gets rough out there", Jay Doyle, Naval Industries; ISSN: 07228880.*
"RAST", www.indaltech.com/products/rast/rast_content.htm pp 1–2.*

* cited by examiner

Primary Examiner—Teri P. Luu
Assistant Examiner—Stephen Holzen
(74) Attorney, Agent, or Firm—Ron Billi

(57) ABSTRACT

An apparatus for illuminating the messenger cable of a helicopter includes a helicopter having a floor and including a RAST system; the RAST system comprising a messenger cable with a connector attached to one end for lowering to a landing deck of a ship, the RAST system further comprising a winch for raising and lowering the messenger cable, a housing attached to the floor of the helicopter through which the messenger cable is raised and lowered, a top of the housing including an opening through which the messenger cable passes, a sheave attached to the top of the housing and over which the messenger cable passes and a pulley attached to the housing and over which the messenger cable passes; a luminescent cover attached to a portion of the messenger cable adjacent the connector; a light mounted on the top of the housing for charging the luminescent cover; and a limit switch mounted on top of the housing for stopping upward motion of the messenger cable.

10 Claims, 3 Drawing Sheets

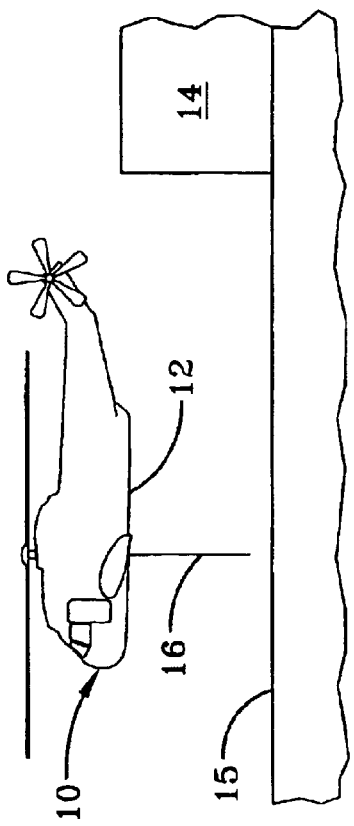
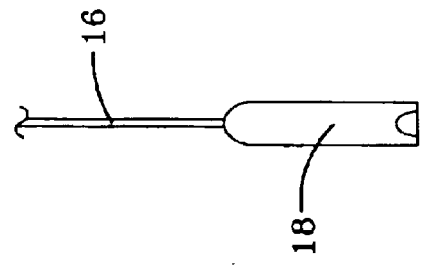
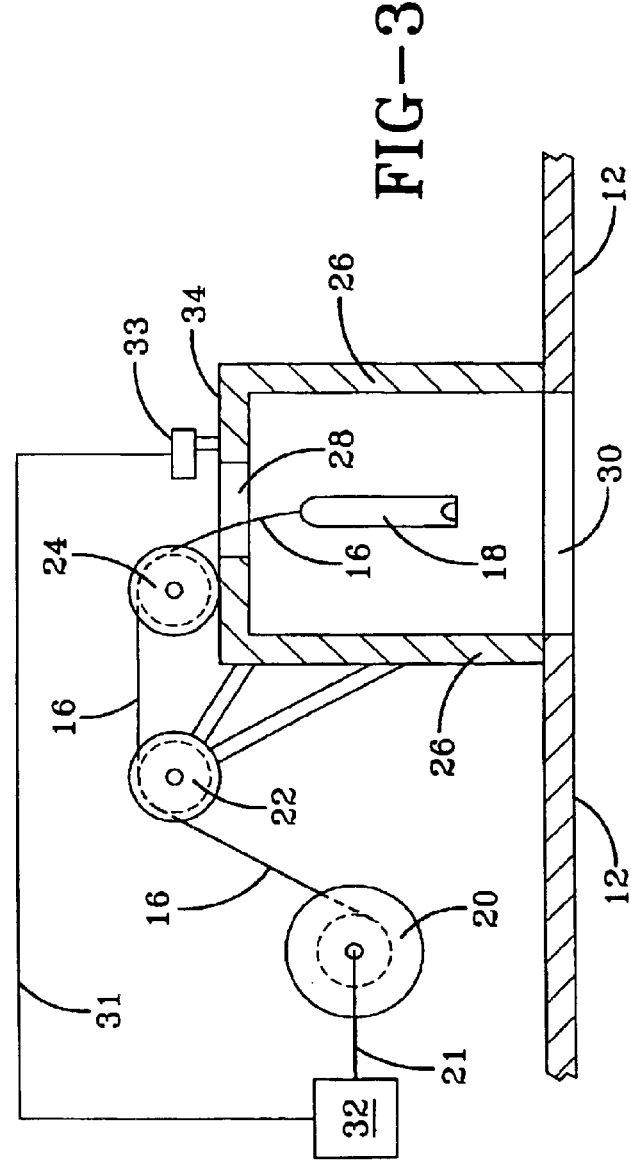

HELICOPTER MESSENGER CABLE ILLUMINATION

STATEMENT OF GOVERNMENT INTEREST

The invention described herein may be manufactured and used by or for the Government of the United States of America for government purposes without the payment of any royalties therefor.

BACKGROUND OF THE INVENTION

The invention relates in general to recovery assist, secure and traverse (RAST) systems used on helicopters and in particular to an apparatus for increasing the visibility of the messenger cable that is lowered from a helicopter.

The RAST system is a landing assist and secure system. It provides the means to assist landing and securing an airborne helicopter to the flight deck of a seagoing ship. The RAST system has components on both the ship and the helicopter. The helicopter RAST system controls an electrically-operated actuator and hoist, which unlatches and extends the RAST main probe and lowers a messenger cable from the main probe to the ship's flight deck. On the flight deck of the ship, the messenger cable is secured to a hauldown cable. The messenger cable, with the hauldown cable attached, is retrieved and reeled into the helicopter through the main probe. When the end of the hauldown cable reaches the main probe, the hauldown cable is secured to the main probe. The shipboard RAST winch then hauls the helicopter down to the flight deck of the ship under the control of the shipboard landing officer.

FIG. 1 schematically shows a helicopter and a ship. Helicopter 10 hovers above ship 14 and lowers messenger cable 16 to landing deck 15. FIG. 2 is an enlarged view of the end of the messenger cable 16 showing the connector 18 for the ship's hauldown cable. The connector 18 is lowered to the deck of ship 14 where the deck crew attaches the ship's hauldown cable to the connector 18. During night landings when the ship's deck is marginally lit, the deck crew may not be able to see the messenger cable 16 to capture it for hookup actions. Dangerous situations occur when the cable 16 becomes snarled with the ship's hardware or entangled with a crewman. Delay to recovery of the helicopter resulting from possible hookup difficulties, especially under worst-case or emergency conditions, also represents an adverse safety element.

The present invention provides improved visibility to the messenger cable 16 and connector 18 to facilitate helicopter landing operations during times of low visibility.

The invention will be better understood, and further objects, features, and advantages thereof will become more apparent from the following description of the preferred embodiments, taken in conjunction with the accompanying drawings.

BRIEF DESCRIPTION OF THE DRAWINGS

In the drawings, which are not necessarily to scale, like or corresponding parts are denoted by like or corresponding reference numerals.

FIG. 1 schematically shows a helicopter and a ship.

FIG. 2 is an enlarged view of the end of the messenger cable.

FIG. 3 schematically shows a portion of a RAST system.

DETAILED DESCRIPTION OF THE PREFERRED EMBODIMENTS

Figure 5:
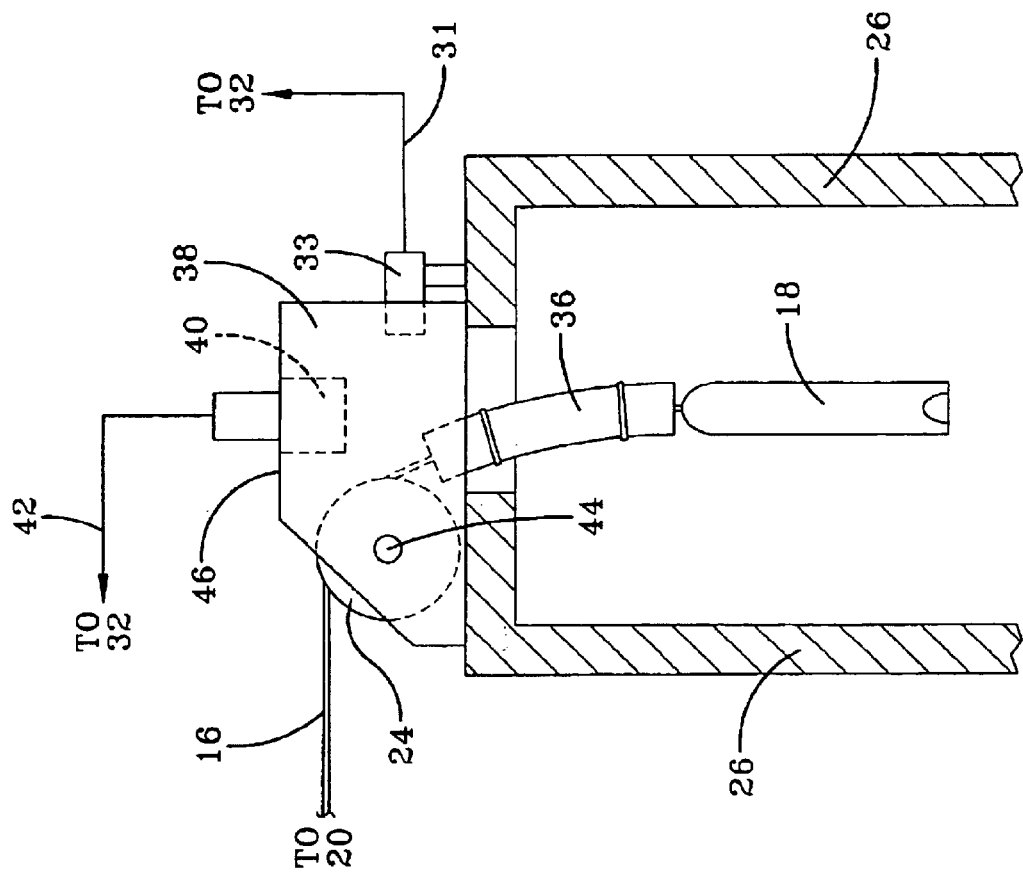
FIG. 5 schematically shows the top portion of the housing 26.

FIG. 3 is a simplified schematic of a portion of a known helicopter RAST system. The helicopter RAST system is described in detail in Navy Technical Manual A1-429QA-130-100, which is incorporated by reference. The RAST system includes a messenger cable 16 with a connector 18 attached to one end. The messenger cable 16 with connector 18 is lowered to the landing deck of a ship 14, for connection to the ship's hauldown cable. The helicopter RAST system further comprises a winch 20 for raising and lowering the messenger cable 16. The winch 20 is electrically actuated and is electrically connected to a control and power panel 32 by wire 21.

A generally cylindrical housing 26 is attached to the floor 12 of the helicopter 10. The messenger cable 16 is raised and lowered through the housing 26 and floor 12 of helicopter 10 via opening 30. The top 34 of the housing 26 includes an opening 28 through which the messenger cable 16 passes. A sheave 24 is mounted at the top 34 of the housing 26. The messenger cable 16 exits the top of the housing 26 and passes over sheave 24 to pulley 22, which may also be attached to housing 26. Messenger cable 16 leaves pulley 22 and is attached to winch 20. Winch 20 lowers and raises messenger cable 16. Limit switch 33 is connected electrically to control and power panel 32 by wire 31. Limit switch 33 causes winch 20 to cut off when messenger cable 16 is fully hauled in.

Figure 4:
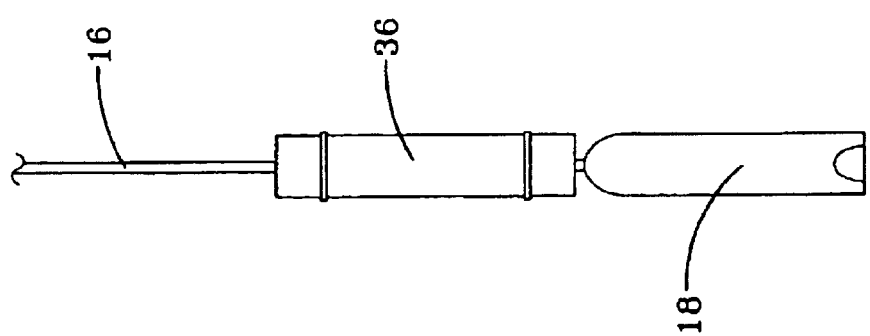
FIG. 4 is an enlarged view of the end of the messenger cable.

FIG. 4 is an enlarged view of a messenger cable 16 with connector 18 and a luminescent cover 36 attached to the portion of the messenger cable 16 adjacent the connector 18. In one embodiment, luminescent cover 36 is a slit tube or hose of extruded luminescent material (such as the Yfestos® material sold by CSD Sealing Systems, 880 Candia Road, Manchester, N.H. 03109) installed over messenger cable 16 and secured thereto with, for example, string ties, plastic clamps or waterproof adhesive. In another embodiment, luminescent cover 36 is a slit clear hose that is filled with a luminescent silicone adhesive caulk material. The length of the luminescent cover 36 is about four inches.

FIG. 5 schematically shows the top portion of the housing 26. Disposed on top of housing 26 is a bracket 38. Sheave 24 is mounted to bracket 38 with push and pull pin 44. Inside bracket 38 is a charging light 40. When messenger cable 16 is in the fully hauled in position, luminescent cover 36 will be adjacent charging light 40. Charging light 40 charges the luminescent cover 36 so that it retains a visual glow for at least 15 minutes. Thus, luminescent cover 36, which is adjacent connector 18, will be visible to the ship's crew when lowered during the helicopter recovery evolution.

Figure 6:
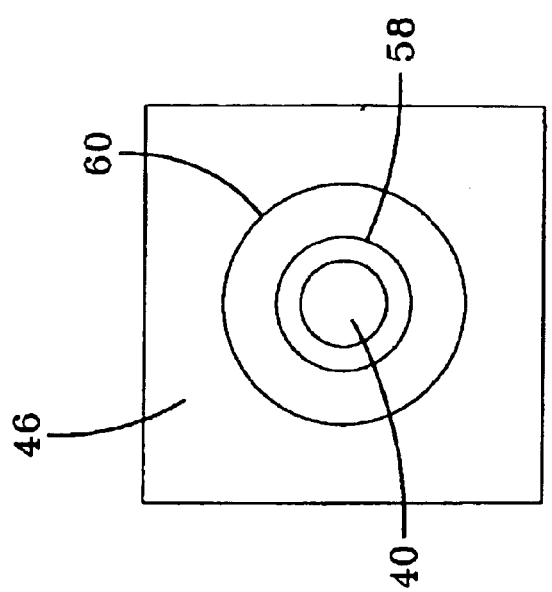
FIG. 6 is a bottom view of the top surface of the bracket.

FIG. 6 is a bottom view of the top surface 46 of the bracket 38. Charging light 40 is preferably a halogen lamp. A suitable halogen lamp is available from Carley Lamps in Torrance, Calif. In particular, Carley Halogen Lamp No. 1012 with a candle power of 12 is preferred. The halogen lamp 40 is mounted in a socket 58, such as a Carley Socket No. 1051, size T-2.5. A reflector 60 is placed around the lamp 40 to focus the light on the luminescent cover 36. A suitable reflector 60 is a parabolic reflector, such as Carley reflector no. 1937. The charging light 40, reflector 60 and socket 58 are mounted on the underside of the removable top 46 of bracket 38.

Figure 7:
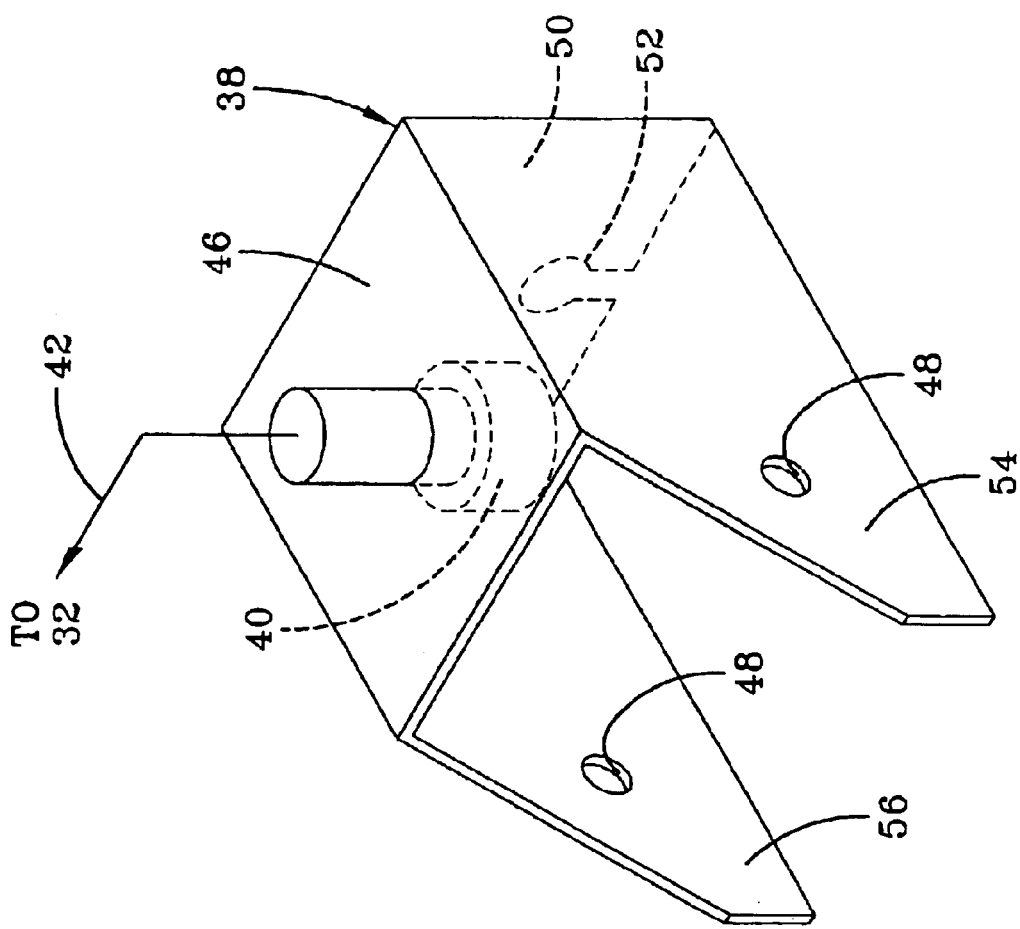
FIG. 7 is a perspective view of the bracket.

FIG. 7 is a perspective view of the bracket 38. Bracket 38 includes a removable top surface 46, a rear surface 50 and side surfaces 54, 56. Side surfaces 54, 56 includes openings 48 formed therein for insertion of push and pull pin 46. As discussed above, the reflector 60, socket 58 and charging light 40 are mounted on the underside of removable top surface 46. Wire 42 connects charging light 40 to control and power panel 32. Rear surface 50 includes an opening 52 (shown in phantom in FIG. 7) formed therein for receiving limit switch 33. Bracket 38 is made of, for example, aluminum. The bottom edges of the side surfaces 54, 56 and rear surface 50 may be attached to housing 26 by, for example, welding.

While the invention has been described with reference to certain preferred embodiments, numerous changes, alterations and modifications to the described embodiments are possible without departing from the spirit and scope of the invention as defined in the appended claims, and equivalents thereof.

What is claimed is:

1. An apparatus, comprising:
   a helicopter having a floor and including a RAST system;
   the RAST system comprising a messenger cable with a connector attached to one end for lowering to a landing deck of a ship, the RAST system further comprising a winch for raising and lowering the messenger cable, a housing attached to the floor of the helicopter through which the messenger cable is raised and lowered, a top of the housing including an opening through which the messenger cable passes, a sheave attached to the top of the housing and over which the messenger cable passes and a pulley attached to the housing and over which the messenger cable passes;
   a luminescent cover attached to a portion of the messenger cable adjacent the connector;
   a light mounted on the top of the housing for charging the luminescent cover, and a limit switch mounted on top of the housing for stopping upward motion of the messenger cable.

2. The apparatus of claim 1 further comprising a bracket attached to the top of the housing wherein the light is mounted inside the bracket.

3. The apparatus of claim 2 wherein the sheave is mounted to the bracket.

4. The apparatus of claim 3 further comprising a push and pull pin for mounting the sheave to the bracket.

5. The apparatus of claim 4 wherein the light comprises a halogen lamp.

6. The apparatus of claim 5 further comprising a reflector around the halogen lamp.

7. The apparatus of claim 6 wherein the bracket comprises a top surface, two side surfaces and a rear surface.

8. The apparatus of claim 7 wherein the halogen lamp and reflector are mounted to an underside of the top surface of the bracket.

9. The apparatus of claim 7 wherein the rear surface of the bracket includes an opening formed therein for receiving the limit switch.

10. The apparatus of claim 7 wherein each side surface includes an opening formed therein for receiving the push and pull pin.

* * * * *